US009993123B2

(12) United States Patent
Moise

(10) Patent No.: US 9,993,123 B2
(45) Date of Patent: Jun. 12, 2018

(54) PORTABLE TOILET SYSTEM

(71) Applicant: Johnny Moise, Brooklyn, NY (US)

(72) Inventor: Johnny Moise, Brooklyn, NY (US)

( * ) Notice: Subject to any disclaimer, the term of this patent is extended or adjusted under 35 U.S.C. 154(b) by 0 days. days.

(21) Appl. No.: 14/944,490

(22) Filed: Nov. 18, 2015

(65) Prior Publication Data

US 2016/0143492 A1     May 26, 2016

Related U.S. Application Data

(60) Provisional application No. 62/083,358, filed on Nov. 24, 2014.

(51) Int. Cl.
*A47K 11/02* (2006.01)
*E04H 1/12* (2006.01)
*E04H 15/38* (2006.01)

(52) U.S. Cl.
CPC ............ *A47K 11/02* (2013.01); *E04H 1/1216* (2013.01); *E04H 15/38* (2013.01); *Y02A 50/454* (2018.01)

(58) Field of Classification Search
CPC ... E04H 1/1216; E04H 1/1244; E04H 15/003; E04H 15/38; A47K 11/00; A47K 11/02
USPC .................. 4/476, 483, 484, 479, 460, 481
See application file for complete search history.

(56) References Cited

U.S. PATENT DOCUMENTS

| 1,563,236 A * | 11/1925 | Smith ..................... A47K 13/00 248/439 |
| 2,142,851 A * | 1/1939 | Jolly ..................... E04H 15/003 135/118 |
| 2,849,726 A * | 9/1958 | Vay ......................... A47K 11/02 4/476 |
| 2,856,942 A * | 10/1958 | Scott ......................... E04H 6/04 135/117 |
| 2,912,702 A * | 11/1959 | MacKenzie ............. A47K 11/04 229/164.2 |
| 3,848,615 A * | 11/1974 | Warner .................... E04G 21/28 135/132 |
| 4,380,836 A * | 4/1983 | Braxton ................ E04H 1/1216 4/449 |
| 4,995,122 A * | 2/1991 | Mohnhaupt ............ A47K 11/02 4/483 |
| D328,126 S * | 7/1992 | Wadsworth, Jr. ............ D23/299 |
| 5,448,785 A * | 9/1995 | Lin ......................... A47K 11/00 4/484 |

(Continued)

*Primary Examiner* — Erin Deery
(74) *Attorney, Agent, or Firm* — Global Intellectual Property Agency, LLC; Jordan Sworen

(57) ABSTRACT

A portable toilet system for allowing a user to go to the bathroom in privacy when a restroom in unavailable. The portable toilet system includes a toilet having an open lower end, a plurality of sidewalls, and an open upper end, defining an interior volume. The sidewalls are pivotally secured to one another such that the toilet can collapse for storing. A toilet seat is pivotally secured to an upper end of the toilet for receiving waste therethrough and supporting a user seated on the toilet. One or more hooks are disposed the sidewalls of the toilet for removably securing a waste bag to the interior of the toilet. The system further includes a collapsible enclosure disposed over the toilet for providing privacy while a user is going to the bathroom. The collapsible enclosure includes one or more fasteners on the interior thereof for supporting toiletries and the like.

7 Claims, 2 Drawing Sheets

(56) References Cited

U.S. PATENT DOCUMENTS

| | | | | |
|---|---|---|---|---|
| RE35,571 E | * | 7/1997 | McLeese | E04H 15/40 |
| | | | | 135/126 |
| 5,937,452 A | | 8/1999 | Brewer | |
| 6,694,538 B1 | | 2/2004 | Jones | |
| 6,718,565 B1 | * | 4/2004 | Cruz | E04H 1/1216 |
| | | | | 135/117 |
| D535,349 S | * | 1/2007 | Shinner | D21/834 |
| 7,260,855 B2 | * | 8/2007 | Aycock | A47K 11/02 |
| | | | | 4/484 |
| 7,418,919 B2 | * | 9/2008 | Smith | B63B 17/02 |
| | | | | 114/361 |
| 7,849,866 B1 | * | 12/2010 | Mangum | A47K 11/04 |
| | | | | 135/117 |
| 2001/0044952 A1 | * | 11/2001 | Becker | B63B 17/02 |
| | | | | 4/449 |
| 2005/0000008 A1 | * | 1/2005 | Spitzer | A61G 9/003 |
| | | | | 4/483 |
| 2006/0169310 A1 | | 8/2006 | Qian et al. | |
| 2009/0019632 A1 | | 1/2009 | Mineo | |
| 2011/0004992 A1 | | 1/2011 | Navarre | |
| 2013/0340159 A1 | * | 12/2013 | Barrett | A47K 3/325 |
| | | | | 4/599 |

* cited by examiner

PORTABLE TOILET SYSTEM

CROSS REFERENCE TO RELATED APPLICATIONS

This application claims the benefit of U.S. Provisional Application No. 62/083,358 filed on Nov. 24, 2014. The above identified patent application is herein incorporated by reference in its entirety to provide continuity of disclosure.

BACKGROUND OF THE INVENTION

The present invention relates to toilet systems. More specifically, the present invention provides a portable toilet system having a foldable toilet that is configured to hold a disposable bag therein. The present invention further includes a collapsible enclosure that can be positioned over the toilet to provide privacy for the user.

When camping, attending an outdoor event, or traveling on a desolate road, it can be difficult to find a restroom. Further, many public restrooms that are available at campsites or crowded public areas are dirty and unsanitary. Some individuals find it difficult to use a dirty restroom and may feel embarrassed to go to the bathroom outdoors, unshielded by the security of building walls. Thus, there exists a need in the prior art for a device that allows a user to go to the bathroom in privacy when a restroom is unavailable.

Devices have been disclosed in the prior art that relate to toilet systems. These include devices that have been patented and published in patent application publications. These devices generally relate to toilets having privacy curtains for placement therearound, such as U.S. Patent Application Publication Number 2011/0004992, U.S. Patent Application Publication Number 2006/0169310, U.S. Patent Application Publication Number 2009/0019632, U.S. Pat. No. 5,937,452, and U.S. Pat. No. 6,694,538.

These prior art devices have several known drawbacks. The prior art fails to provide a system with a foldable toilet and a surrounding collapsible enclosure, wherein the collapsible enclosure comprises one or more attachment fasteners thereon for hanging toiletries. Further, the prior art fails to provide a collapsible enclosure having ground-insertable stakes for securing the collapsible enclosure in place during use.

In light of the devices disclosed in the prior art, it is submitted that the present invention substantially diverges in design elements from the prior art and consequently it is clear that there is a need in the art for an improvement to existing portable toilet systems. In this regard the instant invention substantially fulfills these needs.

SUMMARY OF THE INVENTION

In view of the foregoing disadvantages inherent in the known types of portable toilet systems now present in the prior art, the present invention provides a portable toilet system wherein the same can be utilized for providing convenience for the user when going to the bathroom in privacy when a restroom in unavailable.

It is therefore an object of the present invention to provide a new and improved portable toilet system that has all of the advantages of the prior art and none of the disadvantages.

It is another object of the present invention to provide a portable toilet system comprising a toilet having an open lower end, a plurality of sidewalls, and an open upper end, wherein the sidewalls are pivotally secured to one another in order to collapse the toilet for storing.

Another object of the present invention is to provide a portable toilet system further comprising a toilet seat pivotally secured to an upper end of the toilet for receiving waste therethrough and supporting a user in a seated position atop the toilet.

Yet another object of the present invention is to provide a portable toilet system comprising one or more hooks disposed on the interior of the sidewalls of the toilet for securing a waste bag to the interior of the toilet, wherein the waste bag receives waste therein.

Yet another object of the present invention is to provide a portable toilet system comprising a collapsible enclosure having an accordion-like configuration, wherein a plurality of arcuate shaped elongated cables are pivotally affixed at the ends thereof and covered via a sheet of material for concealing a user as he or she is going to bathroom in the toilet.

Yet another object of the present invention is to provide a portable toilet system wherein the interior of the collapsible enclosure comprises one or more fasteners for supporting toiletries thereon.

Yet another object of the present invention is to provide a portable toilet system comprising one or more ground-insertable stakes disposed along a lower end of the collapsible enclosure in order to secure the collapsible enclosure in place while in use.

Another object of the present invention is to provide a portable toilet system that may be readily fabricated from materials that permit relative economy and are commensurate with durability.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
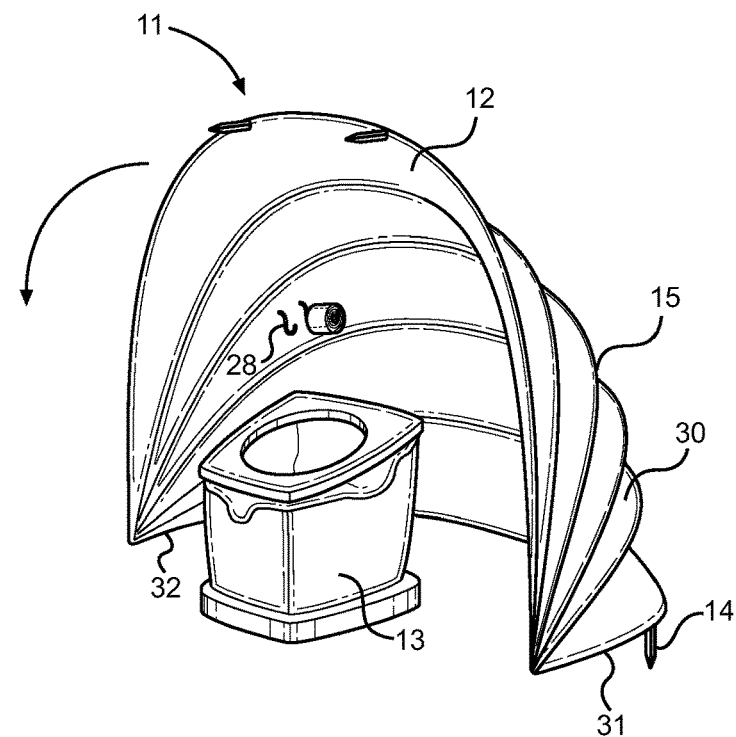
FIG. 1 shows a perspective view of the collapsible enclosure and the toilet of the portable toilet system wherein the collapsible enclosure is partially collapsed.

Reference is made herein to the attached drawings. Like reference numerals are used throughout the drawings to depict like or similar elements of the portable toilet system. The figures are intended for representative purposes only and should not be considered to be limiting in any respect.

Figure 2:
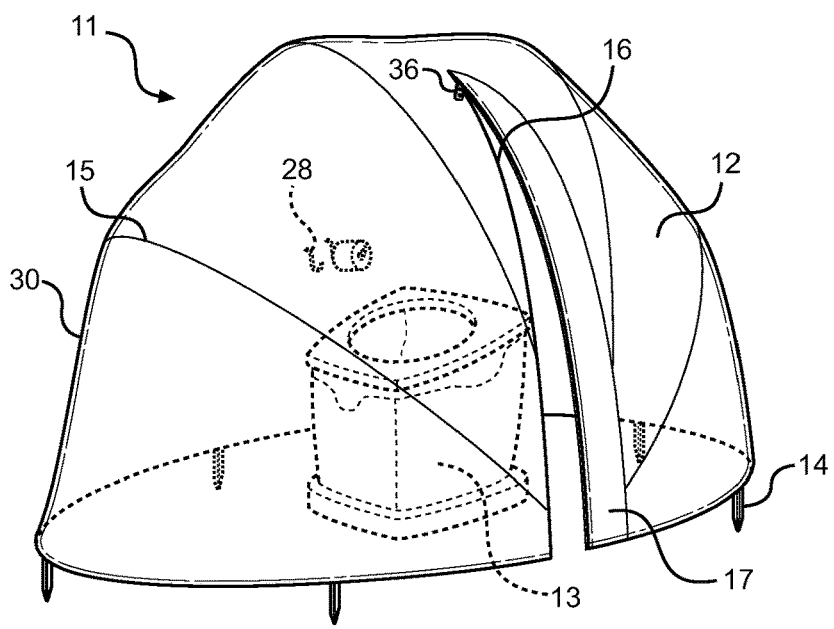
FIG. 2 shows a perspective view of the collapsible enclosure and the toilet of the portable toilet system.

Referring now to FIGS. 1 and 2, there are shown perspective views of the collapsible enclosure and the toilet of the portable toilet system. The portable toilet system 11 comprises a toilet 13 removably covered by a collapsible enclosure 12 in order to conceal and provide privacy to a user seated upon the toilet 13. Both the collapsible enclosure 12 and toilet 13 are collapsible in order to allow for convenient transport and storage of the toilet system 11.

In the illustrated embodiment, the collapsible enclosure 12 includes a hemispherical shape having a plurality of elongated cables 15 extending from a first lateral side 31 to an opposing second lateral side 32 thereof in order to allow enclosure to expand and collapse. The collapsible enclosure 12 comprises an accordion-like configuration, wherein the elongated cables 15 are pivotally affixed at the ends thereof and covered via a sheet of material 30. Each cable 15 comprises an arcuate shape and supports the sheet of material 30 thereover. In an expanded configuration of the collapsible enclosure 12, the cables 15 are disposed at a fixed distance apart from one another and the sheet of material 30 is spread between each cable 15 forming an interior volume. In the collapsed configuration, the cables 15 are disposed adjacent to one another and the sheet of material 30 is folded between each cable 15. The sheet 30 can be composed of any suitable material that provides privacy to a user positioned within the interior of the collapsible enclosure 12, such as Nylon. However, in alternate embodiments, the collapsible enclosure 12 comprises any suitable shape that forms an enclosure having an interior volume, such as a pyramid or cube shape, wherein the cables 15 are configured to support the shape thereof whether in an expanded or collapsed configuration.

The collapsible enclosure 12 further comprises an entryway so as to allow a user to enter and exit the collapsible enclosure 12 in the expanded configuration. In the illustrated embodiment, a vertical line of separation having a first side 16 and a second side 17 is disposed along the frame 30. The first side 16 is removably securable to the second side 17 by a fastener, such as Velcro (hook and loop fasteners), a zipper 36, or the like. In this way, the collapsible enclosure 12 can be fully closed for privacy or open for allowing access to the interior of the collapsible enclosure 12.

In some embodiments, one or more ground fasteners are secured to the lower end of the collapsible enclosure 12 in order to removably secure the collapsible enclosure 12 to the ground so as to secure the collapsible enclosure 12 in place and prevent wind and the like from altering the position thereof. In the illustrated embodiment, the ground fasteners are stakes 14 configured to be inserted into soft ground, such as soil. However, in alternate embodiments, the ground fasteners are hooks that can be attached to external structures, such as a pole, if the ground is unable to receive a stake.

In some embodiments, the interior of the collapsible enclosure 12 includes one or more attachment fasteners configured to receive toiletries thereon, such as toilet paper and hand sanitizer. The attachment fasteners allow for the toiletries to be kept sanitary and removed from the ground. In the illustrated embodiment, the attachment fasteners are hooks 28 having a back end secured to the sheet of material of the frame 30 and configured to support and suspend a hook end therefrom. However, in alternate embodiments, the attachment fasteners can be any suitable configuration that allows toiletries to be support thereon, such as a rod configured to support a hand towel. Each attachment fastener is positioned between a pair of cables 15 so as to permit the collapsible enclosure 12 to collapse, unobstructed by the attachment fasteners.

Figure 3:
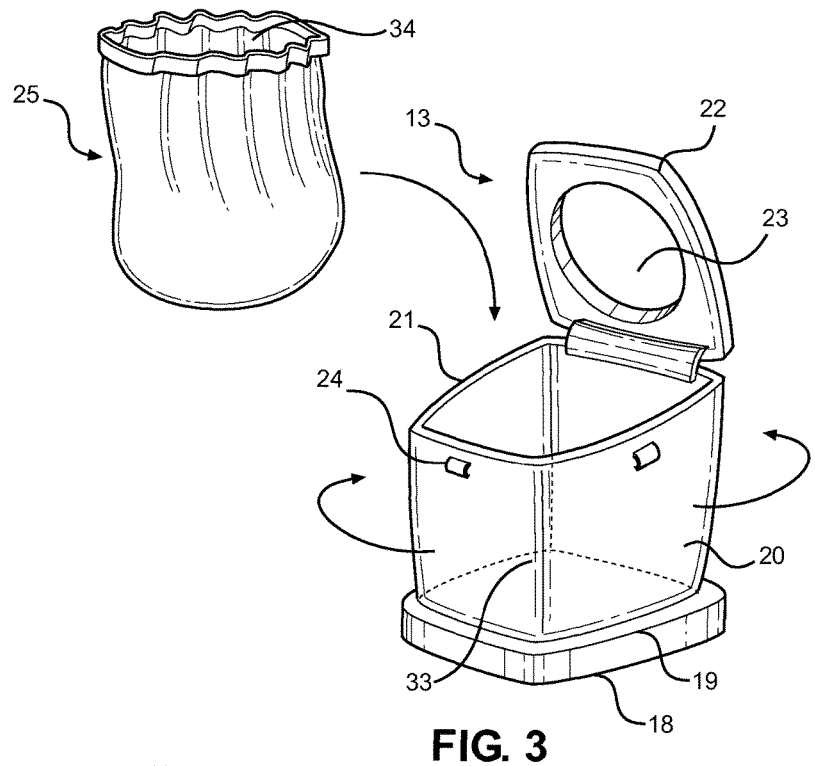
FIG. 3 shows a perspective view of the toilet of the portable toilet system wherein a waste bag is positioned for insertion onto the toilet.
Figure 4:
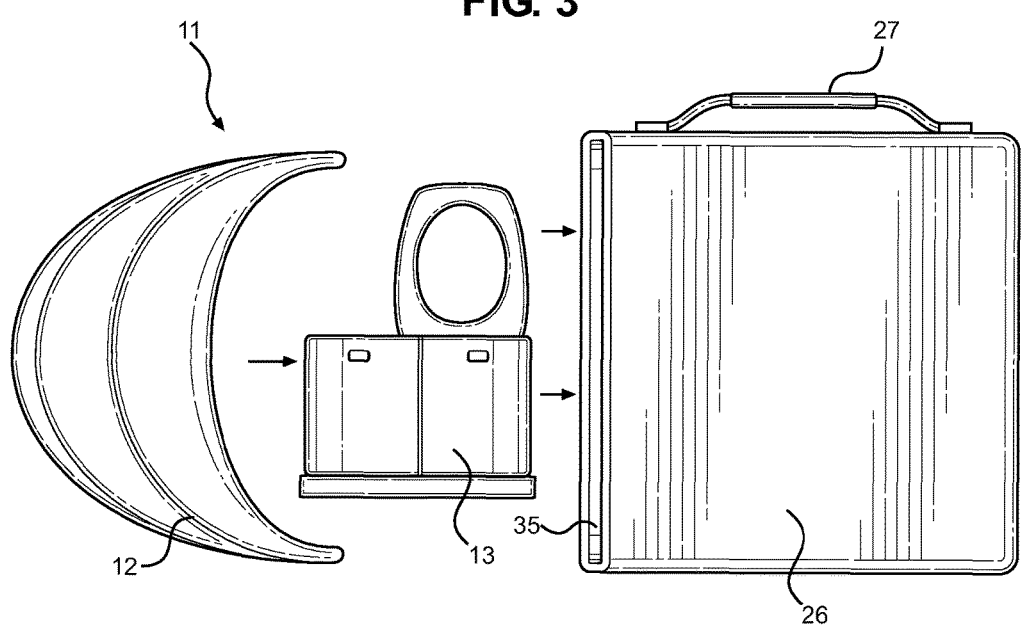
FIG. 4 shows a front view of the collapsible enclosure and toilet in a collapsed configuration and positioned for insertion into a storage bag of the portable toilet system.

Referring now to FIG. 3, there is shown a perspective view of the toilet of the portable toilet system wherein a waste bag is positioned for insertion onto the toilet. The toilet 13 comprises an open lower end 18, a plurality of sidewalls 20, and an open upper end 21, wherein the sidewalls 20 are pivotally secured to one another in order to collapse the toilet 13 for storing. In some embodiments, the lower end 18 of the toilet 13 comprises a ledge 19 extending outward therefrom in order to provide more stability to the toilet 13 when a user is seated thereon. In the illustrated embodiment, the toilet 13 comprises a substantially rectangular shaped cross section, wherein each sidewall 20 is pivotally secured to another via a hinge 33. The hinge 33 comprises a flexible material, such as plastic, that enables a first sidewall 20 to fold substantially flush against or align at a 180 degree angle with an adjacent sidewall 20, as seen in FIG. 4. In alternate embodiments, any suitable hinge may be used to enable the toilet 13 to fold in a collapsed configuration.

A toilet seat 22 is pivotally secured to the upper end 21 of the toilet 13 and comprises an opening 23 configured to receive waste therethrough. The toilet seat 22 is movable between a substantially horizontal position in which it is disposed over the open upper end 21 of the toilet 13, and a lifted position in which the toilet seat is disposed substantially vertical or at an angle greater than 90 degrees from the horizontal position. The horizontal position allows a user to remain seated while using the toilet 13 and the lifted position allows a user to urinate in the toilet 13 while not using the toilet seat 22 to sit on. The dimension of the toilet seat 22 is substantially similar to the open upper end 21 of the toilet 13 so as to allow the toilet seat to rest on the edges of the upper end of the toilet 13. In the collapsed configuration of the toilet 13, the toilet seat 22 may remain at a vertical angle or fold flush against the sidewall 20 on which the toilet seat 22 is attached.

In some embodiments, a waste bag 25 is disposed within the interior of the toilet 13 and removably fastened to one or more hooks 24 disposed along the sidewalls 20 thereof. The hooks 24 are disposed on the upper end 21 of the sidewalls 20 and are configured to receive a waste bag 25 thereon, whereas the upper end of the waste bag 25, having an opening 34 thereon, is folded over the upper end 21 of the toilet 13 and suspended within the interior of the toilet 13. The waste bag 25 is configured to receive waste therein via the opening 34.

In operation, the toilet 13 is positioned within the interior of the collapsible enclosure. A user will enter the collapsible enclosure via the entryway and close the line of connection thereof so as to conceal the user when going to the bathroom. The toilet seat 22 is moved to the lifted position and a waste bag is secured to the hooks 24 of the toilet 13. Depending on the user's preference, the toilet seat 22 will remain lifted or the user will lower the toilet seat 22 to a horizontal position in order to sit thereon. Once the user has finished using the toilet 13, he or she removes the waste bag 25 for disposal and the toilet 13 and collapsible enclosure may be collapsed for storing.

Referring now to FIG. 4, there is shown a front view of the collapsible enclosure and toilet in a collapsed configuration and positioned for insertion into a storage bag of the portable toilet system. In some embodiments, the portable toilet system 11 comprises a storage bag 26 having an interior volume for receiving the collapsible enclosure 12 and toilet 13 therein for storing and transporting the toilet 13 and collapsible enclosure 12 in a collapsed configuration. The storage bag 26 comprises an opening 35 so as to receive the collapsible enclosure 12 and toilet 13 therein. The storage bag 26 further comprises a handle 27 thereon so as to allow a user to conveniently carry the bag 26. The storage bag 26 comprises any suitable configuration known in the art so as to hold the collapsible enclosure 12 and toilet 13 therein.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable toilet system, comprising:
   a toilet having:
      an open lower end, a plurality of sidewalls pivotally secured to one another, and an open upper end, defining an interior volume, wherein the toilet is configured to collapse for storing and wherein the plurality of sidewalls remains pivotally secured to one another in a collapsed position;
      the plurality of sidewalls including a first sidewall having a greater height than a second opposing sidewall such that the open upper end is non-level;
      a ledge disposed along an entire periphery of the open lower end, such that the ledge extends beyond the plurality of sidewalls;
      a toilet seat pivotally secured to the open upper end of the toilet, wherein the toilet seat includes an opening thereon for receiving waste therethrough and configured to removably cover the open upper end of the toilet;
      at least one hook disposed on at least one of the plurality of sidewalls of the toilet for removably securing a waste bag to the interior volume of the toilet;
   a collapsible enclosure having:
      a plurality or elongated cables and a sheet of material secured to each of the plurality of elongated cables, defining an interior volume, wherein the collapsible enclosure is disposed over the toilet and configured to conceal a user seated upon the toilet seat;
      wherein each of the plurality of elongated cables extend from a first lateral side of the collapsible enclosure to an opposing second lateral side of the collapsible enclosure in order to allow the frame to expand and collapse; wherein the collapsible enclosure comprises an entryway configured for access therein; wherein the entryway of the collapsible enclosure comprises a vertical line of separation having a first side removably securable to a second side via one or more fasteners; the vertical line of separation extending from an open lower end of the enclosure.

2. The portable toilet system of claim 1, further comprising a waste bag disposed in the interior volume of the toilet, wherein the waste bag includes an opening configured to receive waste therein.

3. The portable toilet system of claim 1, further comprising a storage bag having an interior volume and an opening for receiving the toilet and the collapsible enclosure within the interior volume of the storage bag.

4. The portable toilet system of claim 1, further comprising one or more attachment fasteners disposed on an interior of an enclosed upper section of the collapsible enclosure for supporting toiletries thereon.

5. The portable toilet system of claim 1, further comprising a one or more ground fasteners disposed along a lower end of the collapsible enclosure in order to secure the collapsible enclosure in place while in use.

6. The portable toilet system of claim 1, wherein the collapsible enclosure comprises a hemispherical shape and each of the plurality of cables comprise an arcuate shape.

7. The portable toilet system of claim 1, wherein the vertical line of separation is disposed between adjacent cables of the plurality of elongated cables.

* * * * *